Oct. 1, 1957
K. N. COSTANZO
2,808,030
DEODORIZING DOG COLLAR
Filed March 5, 1956
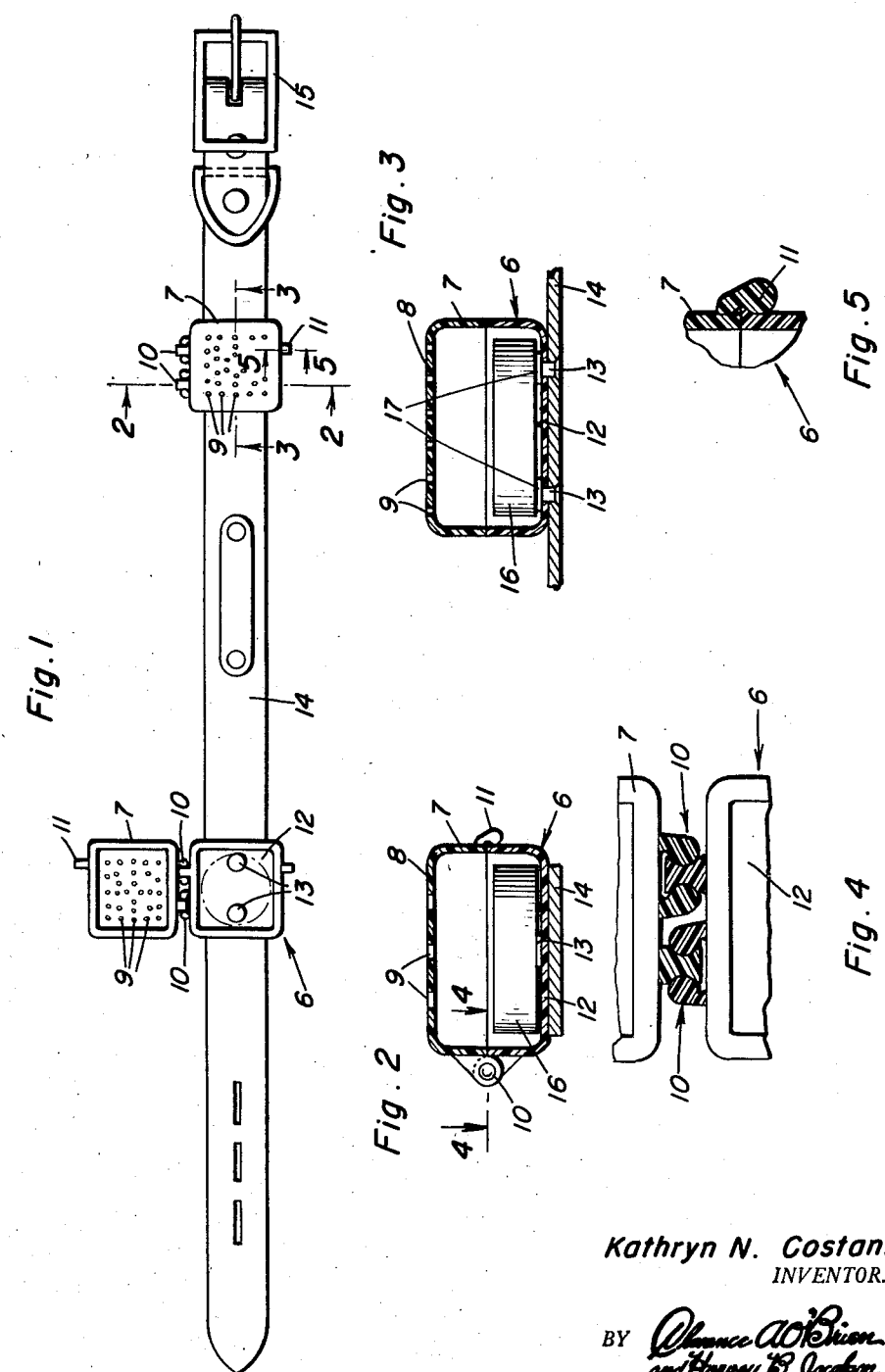
Kathryn N. Costanzo
INVENTOR.

United States Patent Office 2,808,030
Patented Oct. 1, 1957

2,808,030

DEODORIZING DOG COLLAR

Kathryn N. Costanzo, Port Chester, N. Y.

Application March 5, 1956, Serial No. 569,505

1 Claim. (Cl. 119—106)

The present invention relates to new and useful improvements in deodorizers particularly for dogs and other animals and has for its primary object to provide, in a manner as hereinafter set forth, a device of this character comprising a novel container for the reception of a solid, perfumed deodorizing agent in cake form which, when exhausted, may be readily replaced.

Another very important object of the invention is to provide a deodorizer container of the character described which is adapted to be readily mounted for use on an animal collar.

Other objects of the invention are to provide a deodorizer of the aforementioned character which will be comparatively simple in construction, durable, compact, of light weight, attractive in appearance, highly effective in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a top plan view, showing a pair of deodorizers embodying the present invention mounted on a dog collar;

Figure 2 is an enlarged cross-sectional view, taken substantially on the line 2—2 of Figure 1;

Figure 3 is an enlarged longitudinal sectional view, taken substantially on the line 3—3 of Figure 1;

Figure 4 is a further enlarged fragmentary view in horizontal section, taken substantially on the line 4—4 of Figure 2; and, Figure 5 is a further enlarged fragmentary view in vertical section, taken substantially on the line 5—5 of Figure 1.

Referring now to the drawing in detail, it will be seen that the embodiment of the invention which has been illustrated comprises a receptacle or container of suitable dimensions which is designated generally by reference character 6. The container 6, which is substantially square in plan with rounded corner portions, may be of plastic or other suitable material.

A swinging cover 7 provides access to the container 6. The top 8 of the cover 7 has formed therein a multiplicity of perforations 9. The cover 7 is connected to the container 6 by hinges 10 of the type shown to advantage in Figure 4 of the drawing. In the embodiment shown, the hinges 10 are of plastic and are integral with the container 6 and the cover 7. A plastic latch or catch 11 (see Figure 5) on the free end of the cover 7 releasably secures said cover in closed position on the container 6.

The bottom 12 of the container 6 has formed therein spaced openings which accommodate headed fasteners 13 for removably securing said container at any desired point on a dog or other animal collar 14. A suitable buckle 15 is provided for adjustably connecting the end portions of the collar 14. The container 6 is for the reception of a perfumed deodorizing cake 16.

It is thought that the use of the device will be readily apparent from a consideration of the foregoing. Briefly, two or more of the containers may be mounted on the collar 14, as shown in Figure 1 of the drawing. The headed fasteners 13 penetrate the collar 14 and are anchored therein for removably securing the container thereon. The deodorizing agent 16 is placed in the container 6 and the perforated cover 7 is closed thereon and latched. The deodorizing fumes from the cake 16 escape from the container 6 through the perforations 9 in an obvious manner. The heads 17 of the fasteners 13 support the deodorizing cake 16 in spaced relation to the bottom 12 of the container 6 for increasing the circulation of air around said cake 16, thus adding to the effectiveness of the device. It will be noted that the construction and arrangement of parts is such that the deodorizing agent may be readily replenished when necessary. Of course, the container 6, together with the cover 7, may be attractively colored or ornamented if desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

An animal deodorizer comprising a collar for encircling the neck of an animal, a substantially square receptacle mounted on said collar and including a hinged cover having perforations therein for the passage of air therethrough, means for releasably securing said cover in closed position on the container, a perfumed, solid deodorizing cake in said container, and spaced fasteners penetrating the bottom of said container and the collar for securing said container thereon, said fasteners including heads in the container spacing the deodorizing cake from the bottom thereof for the circulation of the air therebetween.

References Cited in the file of this patent

UNITED STATES PATENTS

| | | |
|---|---|---|
| 1,742,962 | McCrosky | Jan. 7, 1930 |
| 2,138,040 | Perry | Nov. 29, 1938 |
| 2,539,940 | Abramson | Jan. 30, 1951 |